United States Patent [19]

Delorme

[11] 4,187,730

[45] Feb. 12, 1980

[54] LEVER CONTROL ARRANGEMENT FOR CONTROLLING THE MOVEMENT OF AN OSCILLATING LEVER

[75] Inventor: M. Raymond Delorme, Bagnolet, France

[73] Assignee: Compagnie Internationale pour l'Informatique, Paris, France

[21] Appl. No.: 807,742

[22] Filed: Jun. 17, 1977

[30] Foreign Application Priority Data

Jul. 7, 1976 [FR] France ............................ 76 20785

[51] Int. Cl.$^{2}$ ............................ F16H 25/08

[52] U.S. Cl. ............................ 74/54

[58] Field of Search ............................ 74/54

[56] References Cited

U.S. PATENT DOCUMENTS

| | | | |
|---|---|---|---|
| 978,783 | 12/1910 | Rose | 74/54 |
| 2,368,830 | 2/1945 | Harrison | 74/54 |
| 2,558,679 | 6/1951 | Gressel et al. | 74/54 |
| 2,953,030 | 9/1960 | Replogle et al. | 74/54 |
| 3,342,395 | 9/1967 | Diepeveen | 74/54 X |

*Primary Examiner*—Francis K. Zugel

*Attorney, Agent, or Firm*—Edward J. Kondracki

[57] ABSTRACT

A control arrangement for controlling the movement of an oscillating lever so as to allow the lever to exert a force of predetermined magnitude on an article placed in its path. Control of the lever is effected through a transmission mechanism which operably connects a control cam between the oscillating lever and an auxiliary lever in contact with the cam. A setting control sets the interacting force of the two levers to a predetermined value, such that, if the oscillating lever in the course of its movement in a first direction arising from rotary movement of the cam is arrested by an article arranged in its path, the force exerted by the oscillating lever on the article is at least equal to the predetermined value multiplied by the ratio between the distance which separates the shaft of the oscillating lever from the point where the interacting force is exerted on the lever, and the distance which separates the same shaft from the point where the oscillating lever is in contact with the article.

10 Claims, 6 Drawing Figures

FIG: 4
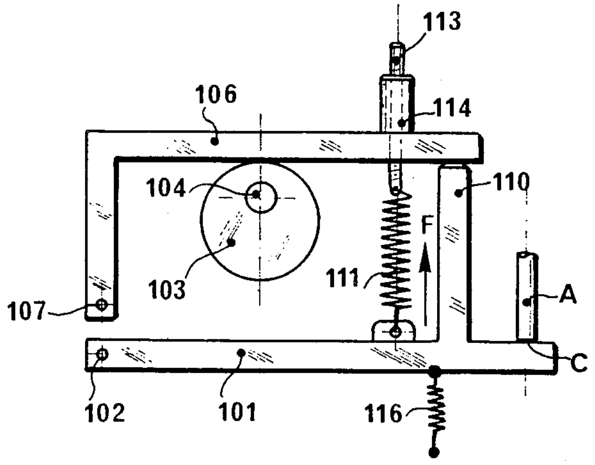
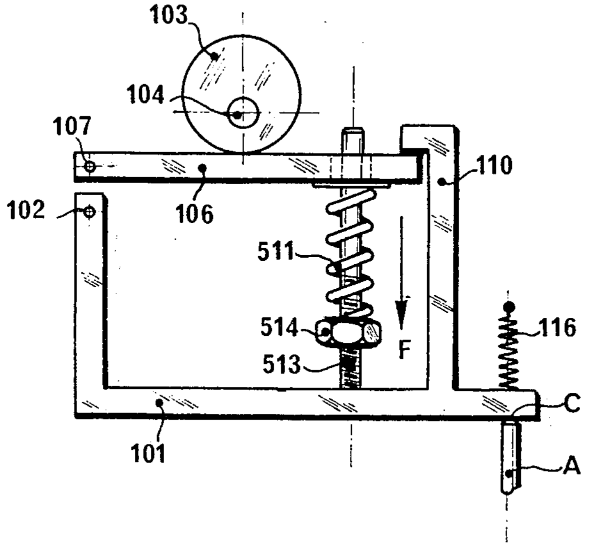
FIG: 5

LEVER CONTROL ARRANGEMENT FOR CONTROLLING THE MOVEMENT OF AN OSCILLATING LEVER

BACKGROUND OF THE INVENTION

The present invention relates to a lever control arrangement for controlling the movement of an oscillating lever.

Such an arrangement may particularly, though not exclusively, be applied to machines which are used to mount integrated-circuit chips on a flexible strip provided with interface conductors and also to machines which enable the chips so mounted to be soldered to an interconnecting base normally referred to as a substrate.

A machine of this kind is described and illustrated, for example, in U.S. Pat. No. 3,887,783 and includes a movable support mounted on sliders and provided at one of its ends with a soldering head. The movable support may be moved by means of a drive motor coupled to the movable support either via a rack-and-worm mechanism or via a cam and oscillating lever mechanism and arranged to enable the soldering head to be brought into contact with the articles to be soldered.

To obtain soldered joints of a high quality, it is necessary for adequate pressure to be exerted by the soldering head on the parts to be soldered during the soldering operation. Nevertheless, this pressure should not exceed a predetermined limiting value so as to prevent the substrates or the integrated circuit chips from being damaged as a result of excessive pressure. This is why, in such machines, it is necessary for the force with which the soldering head is pressed against the parts to be soldered to remain between two predetermined limiting values.

In the machine which forms the subject matter of the above-identified patent, this force is provided by a leaf spring which, providing as it does a connection between the rack and the support, becomes subject to deformation from the time when, the motor having been actuated to move the soldering head towards the articles to be soldered, the movement of the head is arrested by the said articles. However, this arrangement is not entirely satisfactory because the force with which the soldering head is pressed against the articles to be soldered depends upon the extent to which the leaf spring is deformed and it is difficult to adjust the amount of this deformation accurately so that the force in question will meet the condition hereinbefore stated. Also, given that in the machine in the above-identified patent the soldering head in the course of its movement also has to engage in a cutting die arranged in its path and, in order to detach the chip from the strip on which it was mounted, has to exert sufficient force to cut through the interface conductors of a chip which has previously been placed over the die, this arrangement requires extremely fine adjustments and thus proves particularly expensive.

The present invention seeks to overcome these disadvantages and provides a lever control arrangement which, in controlling the movement of an oscillating lever, allows the lever to exert a force of predetermined magnitude on an article placed in its path, which article may, for example, be formed by a movable support provided with a soldering head.

SUMMARY OF THE INVENTION

The invention relates to a mechanical arrangement for controlling the movement, first in one direction and then in the other, of a lever, termed the main lever, which is pivotally mounted on a shaft. Included in this arrangement is a cam attached to the shaft of a drive motor, with action of the cam on the main lever takes place via a transmission mechanism. The transmission mechanism consists of an auxiliary lever which is pivoted about a shaft arranged parallel to the shaft of the main lever and which is in contact with the said cam, spring means interposed between these two levers and adapted to urge the main lever in its first direction of movement, restraining means attached to the levers to prevent the main lever, when urged by the said spring means, from moving past a predetermined position with respect to the position of the auxiliary lever, and setting means associated with the said spring means to adjust the interacting force exerted by the spring means on the two levers to a predetermined value, as a result of which, if the main lever in the course of its movement in the first direction arising from the rotary movement of the cam, is arrested by an article placed in its path, the force exerted by the main lever on the article is at least equal to the said predetermined value multiplied by the ratio between the distance which separates the shaft of the main lever from the point where the said interacting force is exerted on said lever, and the distance which separates this same shaft from the point where the main lever is in contact with the said article.

BRIEF DESCRIPTION OF THE DRAWINGS

The invention will now be further described, by way of example, with reference to the accompanying drawings, in which:

FIG. 4 is a schematic view intended to show the principal features of a control arrangement constructed in accordance with the invention;

FIG. 5 is a modified embodiment of the control arrangement of the invention.

DESCRIPTION OF THE PREFERRED EMBODIMENTS

Figure 1:
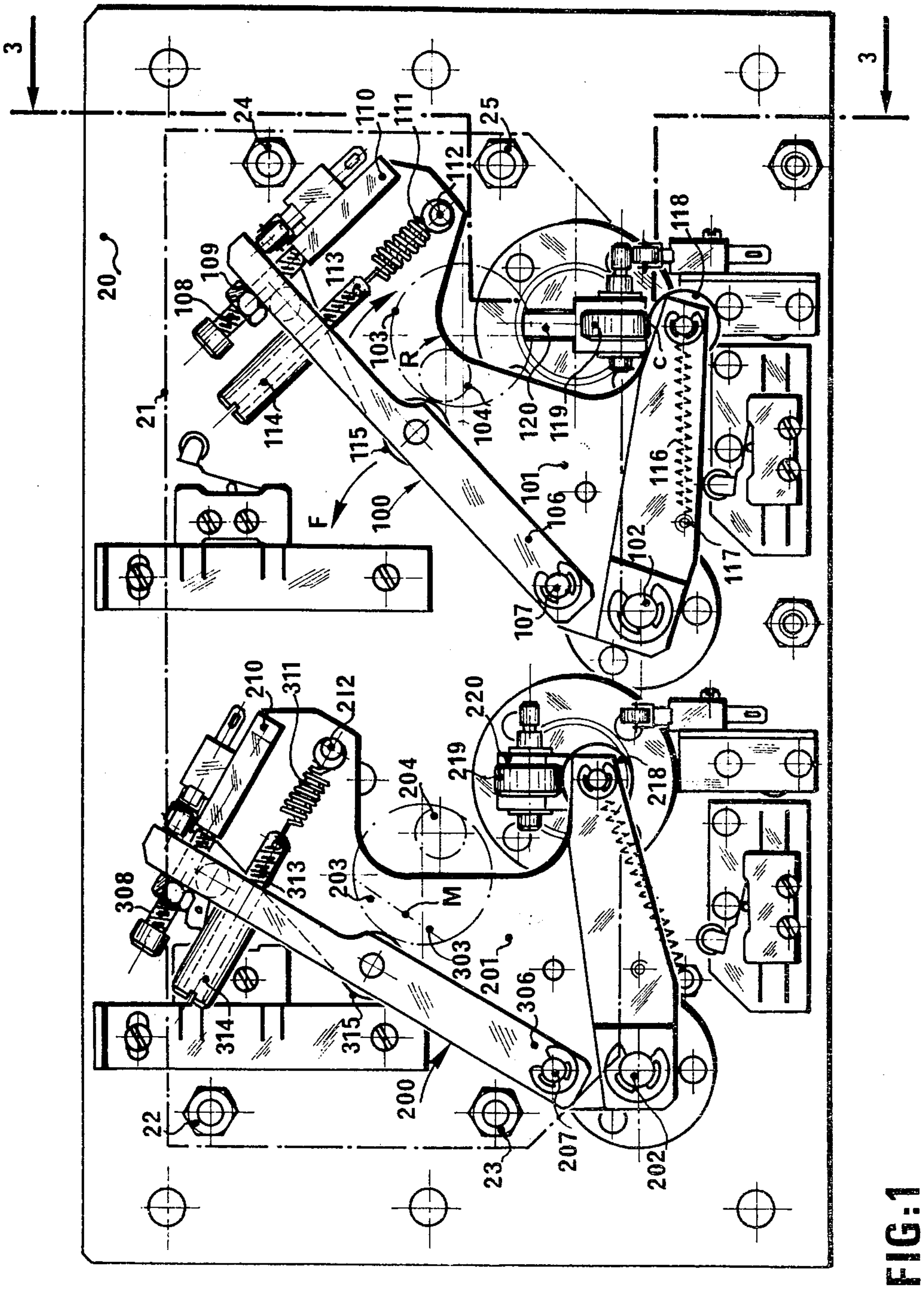
FIG. 1 is an elevation view of part of a machine incorporating two control arrangements constructed in accordance with one embodiment of the invention.
Figure 2:
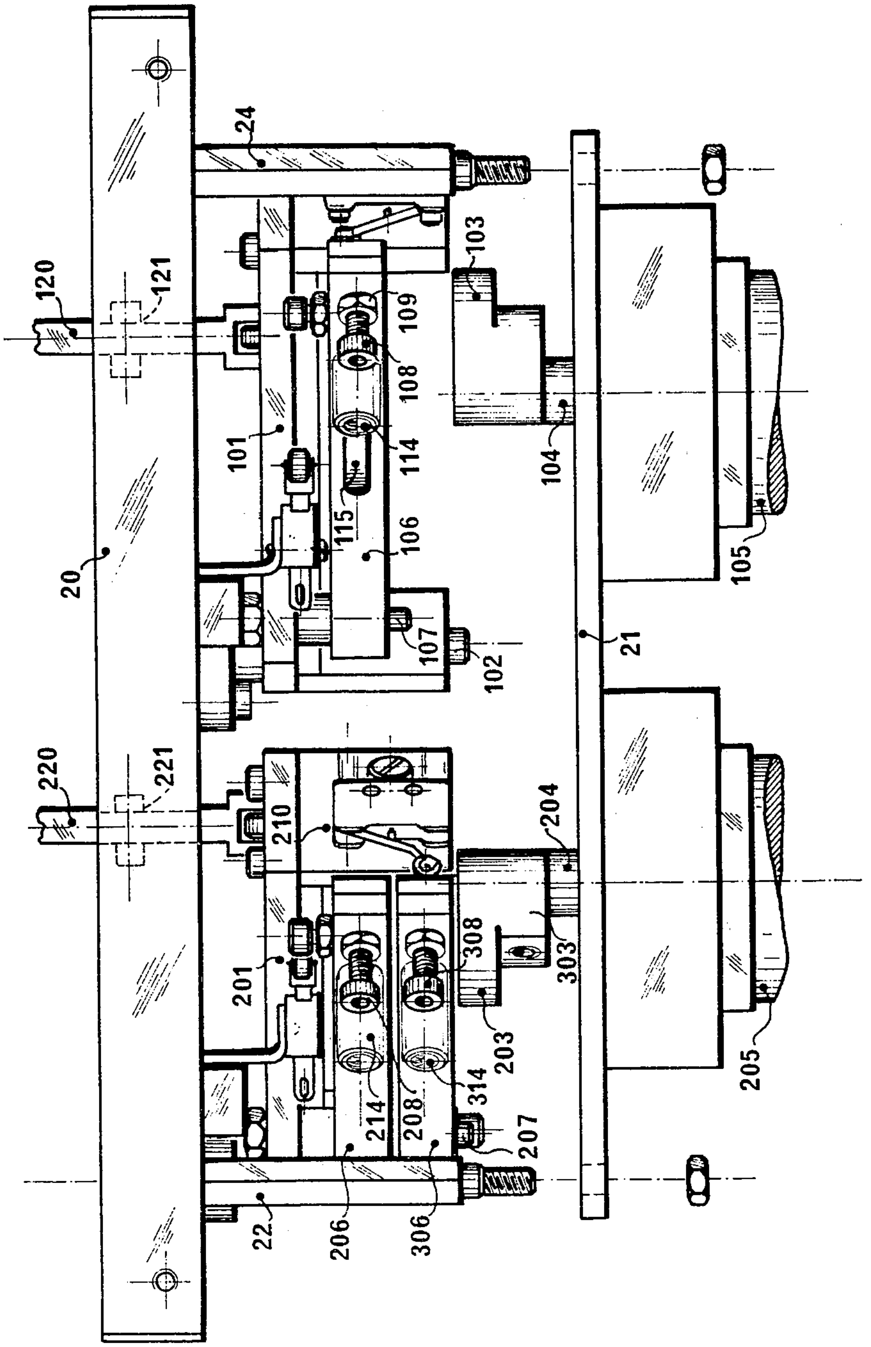
FIG. 2 is a plan view of the part of the machine shown in FIG. 1.
Figure 3:
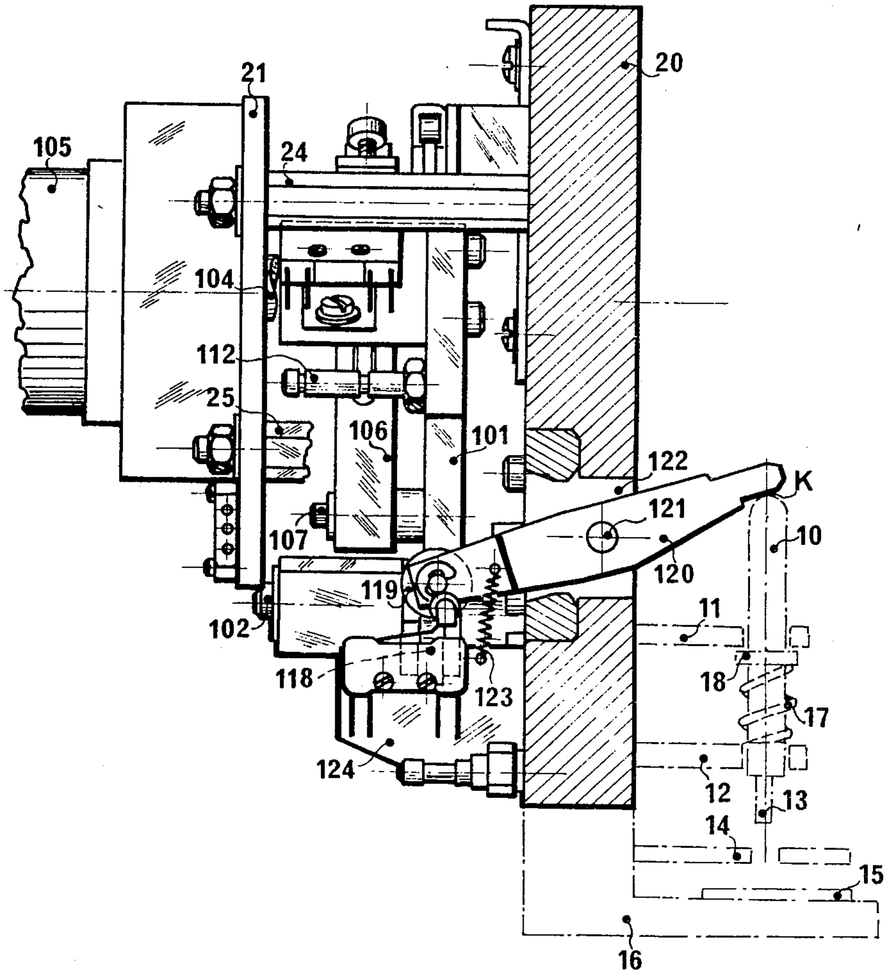
FIG. 3 is a sectional view on line 3—3 of FIG. 1.

The machine of which part is shown in FIGS. 1, 2 and 3, is intended on the one hand to cut through the interface conductors of an integrated-circuit chip which has previously been mounted on a flexible strip, so that the said chip can be detached from the said strip and then positioned against a substrate, and on the other hand to solder the chip to the substrate. These two operations are performed in succession in the machine by means of two tools, namely a cutting and transporting tool and a soldering tool. These two tools, which are closely related structures, are not shown in FIGS. 1 and 2 for the reason that they form no part of the invention. However, for the purposes of explanation, the structure of the more complex of the two tools, that is to say the cutting and transporting tool, is shown diagrammatically in chain lines in FIG. 3.

If reference is therefore made to FIG. 3, it can be seen that the tool is formed in essence by a support rod 10 which passes through two holes formed in respective ones of two fixed plates 11 and 12 and, is able to slide vertically. At its lower end as viewed in the drawing, the support rod 10 carries a cutting head 13 which, when the support rod moved downwards, passes through a cutting die 14 and comes into contact with a substrate 15 positioned on a horizontal plate 16. If the position shown in FIG. 3, the support rod 10 and the cutting head 13 are held in a normal position remote from the substrate 15 and above the die 14 by a compression spring 17 which is mounted between the plate 12 and a collar 18 attached to the support rod 10, as shown in FIG. 3. This being the case, if, after an integrated circuit chip mounted on a strip has been positioned over the cutting die 14, the support rod 10 is lowered in a manner which will be described below, the cutting head 13 as it enters the die 14 cuts through the interface conductors of the chip. The chip is thus detached from the strip and is then carried forward by the head 13 until it comes into contact with the substrate 15. No further details will be given of the structure of the cutting and transporting tool since its structure is similar to that described in U.S. Pat. No. 3,887,783 with the difference, however, that head 13 performs only the cutting and transporting functions in the present case and, since it does not have to perform soldering operations, it is not subject to Joule effect heating.

The substrate 15 against which the chip has thus been placed is then positioned under a soldering tool whose structure is similar to that of the cutting and transporting tool just described, except that the soldering tool has no cutting die and the head which is mounted at the end of its support rod, after being brought into contact with the chip on the substrate, is heated by an electric current to enable the interface conductors on the chip to be soldered to the contact areas on the substrate in a manner similar to that which is incidentally described in the above-identified U.S. Pat. No. 3,887,783.

There will now be described, with reference to FIGS. 1, 2 and 3, the structure of the control arrangement which enables the soldering tool just discussed to be operated. This control arrangement, which is indicated generally by reference 100 in FIG. 1, is arranged between two vertical support plates 20 and 21 (FIG. 2) which are held spaced from one another by means of four distance pieces or spacer rods 22, 23, 24 and 25. In FIG. 1, support plate 21 is not shown in order to enable certain details of the arrangement 100 to be seen more clearly, but its outline is indicated by a chain line.

The control arrangement 100 includes an oscillating lever 101, which will be referred to in what follows as the main lever and which pivots on a horizontal shaft 102 attached to support plate 20. The arrangement 100 also includes a cam 103 which is mounted on the shaft 104 of an electric motor 105 which is in turn attached to support plate 21, as shown in FIGS. 2 and 3. The electric motor 105 is not shown in FIG. 1 in order not to crowd the drawing to no purpose and in this same Figure shaft 104 and cam 103 are indicated schematically by a chain line for the same reason. Thus, FIG. 1 shows that in the embodiment being described the cam 103 is formed by an eccentric. Cam 103 is not in contact with the main lever 101 and its action on the latter is effected via a transmission mechanism which will be described in detail below.

The transmission mechanism includes an oscillating lever 106, which will be referred to herein as the auxiliary lever and which is pivoted at one end on a horizontal shaft 107 attached to the main lever 101. In the case of the embodiment being described, shaft 107 is preferably positioned close to shaft 102, as shown in FIGS. 1 and 3. At its other end the auxiliary lever 106 is provided with an adjustable stop which is formed, as can be seen in FIG. 1, by a screw 108 which is engaged in a tapped hole in lever 106 and which can be locked in position by means of a lock nut 109. The main lever 101 is provided with an abutment 110 against which screw 108 is held pressed by a traction spring 111, one of whose ends is anchored to an attachment pin 112 secured to lever 101 and whose other end is anchored to a fastening rod 113, this rod 113 passing freely through a hole formed in lever 106 and being held by a sleeve 114 which is screwed onto a threaded part of the rod. This being the case, it is possible by turning the sleeve 114 to tension the traction spring 111 to a greater or lesser degree, thus enabling the interacting force exerted by spring 111 on levers 101 and 106 to be accurately adjusted to a set value T which will be defined below.

It will be assumed that, in the example being described, this force T is of the order of 900 grams. FIG. 1 also shows that the auxiliary lever 106 is provided with a roller 115 which is held in contact with cam 103 on the one hand by the weight of the assembly which is pivoted about shaft 102 and on the other hand by a return spring 116 which is tensioned between a point on the main lever 101 and an attachment pin 117 fastened to support plate 20. It should also be mentioned that the force which is exerted by spring 116 is neglible in comparison with that exerted by spring 111 and as a result screw 108 normally remains in contact with abutment 110.

If reference is now made to FIGS. 1 and 3, it will be seen that the main lever 101 is also provided with a roller 118 and that in contact with this roller there is another roller 119 which is positioned at one of the ends of the an intermediate lever 120. Lever 120 is pivoted on a horizontal shaft 121 mounted in an opening 122 in support plate 20. Intermediate lever 120 thus passes through support plate 20 and its other end is in contact with the support rod 10 of the soldering tool. In this regard, it will be recalled that the structure of the soldering tool is similar to that shown in FIG. 3 though with the important difference that the soldering tool does not incorporate a cutting die 14. A low-tension traction spring 123 mounted between the intermediate lever 120 and a bracket 124 attached to support plate 20 enables roller 119 to be held in contact with roller 118.

In FIG. 1, the cam 103 is shown in its bottom dead center position, which is the same thing as saying that roller 115 and the auxiliary lever 106 are both in the positions where they are closest to shaft 104. As long as shaft 104 does not turn, the auxiliary lever 106 remains stationary. The main lever 101, being subject to the interacting force exerted by spring 111 on levers 101 and 106, is in fact urged to move in the direction which is indicated by an arrow F in FIG. 1, but is prevented from so doing by screw 108, which is in contact with abutment 110, and it therefore remains in a position, with respect to the auxiliary lever 106, which is determined by the setting of screw 108.

If motor 105 is now energized by an electrical current so as to turn shaft 104 in the direction indicated by arrow R in FIG. 1, roller 115 is thrust back by cam 103 and moves in the direction of arrow F and as it moves takes with it the assembly formed by the auxiliary level 106, screw 108, lock nut 109, rod 113 and knob 114. The main lever 101 is then subject to the interacting force exerted by spring 111, this force being applied to attachment pin 112 and being, as long as screw 108 remains pressed against abutment 110, of a magnitude equal to the set value T mentioned above. If the distance between pin 112 and the shaft 102 about which the main lever pivots is called D, the moment M of this force with respect to shaft 102 is given by:

$$M=T\cdot D$$

The main lever 101, under the prompting of this interacting force, moves in the direction of arrow F. In the course of this movement, roller 118 raises that end of lever 120 to which roller 119 is attached and lever 120 thus pivots about its shaft 121 (FIG. 3) and compells the support rod 10 to descend and slightly compress spring 17. Interacting force T is adjusted to a value such that the screw 108 on lever 106 (FIG. 1) remains pressed against abutment 110 as long as the soldering head 13 (FIG. 3) which is mounted at the end of rod 10 is not arrested in its downward movement. The result is that the force P which is exerted by roller 118 on roller 119 (FIG. 1) is such that its moment with rspect to shaft 102 is equal to the moment of the interacting force T with respect to this same shaft. If D' is the distance which separates shaft 102 from the point of contact C between the two rollers 118 and 119, this force P is thus expressed by:

$$P\cdot D'=T\cdot D$$

that is to say by:

$$P=T\cdot D/D'$$

It should be mentioned here that, as can be seen in FIG. 3, the distance between shaft 121 and the pivot shaft of roller 119 is substantially the same as that which separates shaft 121 from the point K at which the support rod 10 is in contact with lever 120. This being the case the force which the intermediate lever 120 exerts on the support rod 10 is substantially equal to P.

The downward movement of the soldering head 13 continues until such time as it comes into contact with an integrated circuit chip which has previously been positioned against substrate 15. At this moment, the support rod 10 is brought to a halt and thus blocks the movement of levers 120 and 101. This blocking takes place slightly before cam 103 reaches its top dead center position, that is to say slightly before shaft 104 has rotated through 180°. This being the case, cam 103, driven by shaft 104, continues to move the auxiliary lever 106 in the direction of arrow F. Because the main lever 101 remains stationary, the auxiliary lever 106 thus moves with respect to the main lever and screw 108 draws away from the abutment 110 against which it had been pressed up to that point. The effect of this movement is to tension the traction spring 111 to a greater degree, thus increasing the interacting force T between levers 101 and 106, this force reaching a maximum value Tm at the moment when cam 103 reaches its top dead center position. The result is that the force exerted by roller 118 on roller 119 increases, as also does that exerted by lever 120 on support rod 10, with the maximum value Pm reached by this force at the time when cam 103 is in the top dead center position being given by:

$$Pm=Tm\cdot D/D'$$

It may also be mentioned that this value Pm depends on the value of Tm, that is to say on the elongation undergone by spring 111 when the auxiliary lever 106 draws apart from the main lever 101. This being the case, by making a preliminary adjustment by means of screw 108 to the position of lever 106 with respect to lever 101, it is possible to adjust the value of Tm, and thus the value of Pm, in such a way that the pressure with which the soldering head 13 is pressed against the integrated circuit chip remains less than a limiting value at which damage would be likely to occur to the chip or the substrate.

From the explanation which has just been given, it will be realized that the force exerted by lever 120 on the support rod 10 remains between the values P and Pm, the change in this force taking place during the time when the head 13 is in contact with the chip. Cam 103, which continues to be moved by shaft 104 after reaching its top dead center position, now allows lever 106 to move in the opposite direction from arrow F under the action of spring 111. Lever 101 remains stationary until such time as screw 108 comes to bear again against abutment 110. From this moment on the assembly formed by the two levers 101 and 106 moves in the opposite direction from arrow F under its own weight and the restoring action of spring 116. Because of this, roller 118 allows that end of lever 120 which is fitted with roller 119 to move down again. Lever 120 thus pivots about its shaft 121 under the prompting of spring 123, thus allowing the support rod 10 to rise again under the prompting of compression spring 17. The rising movement of the support rod and the head 13 which it carries continues until such time as cam 103 has again reached its bottom dead center position.

There will now be described, with reference to FIGS. 1 and 2, the structure of the control arrangement which enables the cutting and transporting tool to be operated. This control arrangement, which is indicated by reference 200 in FIG. 1, is of similar construction to the control arrangement 100 and the parts of which it is formed are designated by reference which are obtained by substituting the reference character 2 for the hundreds digit of the references which refer to similar items in control arrangement 100. Thus, the main lever of control arrangement 200 is indicated by reference numeral 201, the shaft about which this lever 201 pivots is indicated by reference 202, and so on. Similarly, in control arrangement 200, the auxiliary lever 206 corresponds to the auxiliary lever 106 of arrangement 100, which lever 206 presses by means of a roller, which is not shown, against a cam 203 which is mounted on the shaft 204 of an electric motor 205 which is in turn attached to support plate 21, as shown in FIG. 2. This lever 206 is provided with a screw 208 which, like screw 108 of lever 106, is caused to abut against an abutment 210 secured to lever 201 under the prompting of a traction spring which, being attached in a manner similar to spring 111, is not shown in the drawings for reasons of simplicity. It will merely be mentioned that one of the ends of the spring is attached to a pin 212 secured to lever 201.

FIG. 1 shows that the main lever 201 is provided with a roller 218 which is in contact with another roller 219. Roller 219 is in turn mounted at one of the ends of an intermediate lever 220 similar to lever 120. This intermediate lever 220 which, as can be seen in FIG. 2, passes through the support plate 20, is pivoted about a shaft 211 and its other end is in contact with the support rod of a cutting and transporting tool whose structure is as described above with reference to FIG. 3.

The control arrangement 200 also includes, as can be seen in FIG. 2, an additional auxiliary lever 306 which is pivoted on shaft 207, this shaft 207 thus being the pivot shaft common to auxiliary levers 206 and 306.

The lever 306, which will be termed the second auxiliary lever in the remainder of the text, is provided with a screw 308 (FIG. 1) which, like screw 208 of lever 206, is caused to abut against abutment 201 under the prompting of a traction spring 311, one of whose ends is attached to pin 212 and whose other end is attached to a fastened rod 313. Rod 313 passes through lever 306 and is held by a knob 314 similar to knobs 114 and 214. As FIG. 2 shows, the shaft at 204 of motor 205 is provided with a second cam 303 against which lever 306 is able to press by means of a roller 315 (FIG. 1). FIG. 1 shows that the profile of cam 203 is identical to that of cam 103, that is to say it is formed by an eccentric, whereas the profile of the additional cam 303 differs from that of cam 203 in that there is a flat M formed on the part of the eccentric which is situated close to its top dead center point.

In FIG. 1, cam 203 is shown in its top dead center position. If, beginning from this position, motor 205 is energized to turn shaft 204 through 180, the cams 203 and 303 which are attached to shaft 204 will then both be situated in their bottom dead center positions. In this latter position, the second auxiliary lever 306 is pressed, via its roller 315 against cam 303, while the first auxiliary lever 206 is pressed, via a similar roller, against cam 203. If, when cams 203 and 303 are both in their bottom dead center position, motor 205 is energized to turn shaft 204, the two rollers are pushed back by cams 203 and 303 and move, taking with them as they do so the auxiliary levers 206 and 306 on which they are respectively mounted. The main lever 201 thus becomes subject to a force which is the resultant vector of the two forces of interaction which are exerted respectively by spring 311 and the similar traction spring associated with lever 206, these two forces being applied to pin 212 and being, as long as screws 208 and 308 remain pressed against abutment 210, of magnitudes equal to the values T2 and T3 to which the two traction springs have been respectively set. This being the case, the main lever 201 is subject to a resultant motive force $Tr=T2+T3$.

In particular, if the two set values are both of the same magnitude T as the force exerted by traction spring 111, this motive force is equal to:

$$Tr=2T.$$

Under the action of this force, the main lever 201 moves and its roller 218 raises roller 219, thus compelling lever 220 to pivot, the force P exerted by rollers 218 on roller 219 being given by the equation:

$$P=Tr\cdot D/D'$$

in which D is the distance which separates pin 212 from shaft 202 and D' is the distance which separates shaft 202 from the point where rollers 218 and 219 make contact. The intermediate lever 220, pivoting about its shaft 221, lowers the support rod of the cutting and transporting tool, the force exerted by lever 220 on the support rod being substantially equal to P, i.e. to (T2+T3)·D/D'. In the special case where the values to which the traction springs of the auxiliary levers 206 and 306 have been set are both equal to T, the force thus exerted by lever 220 on the support rod substantially equal to 2T·D/D'. It may be mentioned that under these conditions the force in question is in fact greater than the force exerted by the intermediate lever 120 on the support rod of the soldering tool, and that, in the aforementioned special case, its value is twice that exerted by lever 120.

It will thus be appreciated that, when the cutting head which is mounted at the end of the cutting and transporting tool comes into contact with an integrated circuit chip which has previously been positioned over the cutting die 14 (FIG. 3), the force which the head exerts on the interface conductors which connect the chip to the strip on which it is mounted is sufficient to cut through the conductors when the head enters the die. The chip which is thus detached from the strip is, however, held in contact with the head in a known fashion, for example, by pneumatic suction, and it is thus conveyed towards the substrate by the head as the support rod of the cutting and transporting tool descends.

Since shaft 204 (FIG. 1) continues to turn there comes a time when roller 315 of lever 306 moves off the eccentric part of cam 303. At this moment, roller 315 is unable to press against the flat M on the cam, because the corresponding roller on lever 206 continues to be thrust back by cam 203 and because lever 206, as it continues to move away from shaft 204, takes with it as it moves the main lever 201; this main lever 201 thus forcing back the auxiliary lever 306 via abutment 210 and screw 208, which prevents roller 315 from making contact with the flat on cam 303. This being the case, the magnitude of the force which is exerted on pin 212 is now equal only to the value T2 to which the traction spring of auxiliary lever 206 has been set. The result is that the force which lever 220 exerts on the support rod of the cutting and transporting tool becomes substantially equal to T2·D/D', or, in the special case where T2=T, to a value T·D/D' equal to that of the force exerted by the intermediate lever 120 on the support rod of the soldering tool.

The downward movement of the cutting and transporting head continues until such time as the chip which is carried along by the head comes into contact with the substrate. At this moment, the support rod to which the head is attached is brought to a halt and this blocks the movement of levers 220 and 201. This blocking takes place slightly before cam 203 has reached its top dead center position. Because of this, cam 203 driven by shaft 204 continues to force back the auxiliary lever 206, thus compelling screw 208 to draw away from the abutment 210 against which it was pressed up to that point. The traction spring which is mounted between lever 206 and the pin 212 on the main lever 201 is thus subjected to elongation, the effect of which is to increase the interacting force which is exerted between the two levers 201 and 206, this force reaching a maximum value Tm at the moment when cam 203 reaches its top dead center position. The result is that the force exerted by roller 218 on roller 219 increases, as also does that exerted by lever 220 on the suport rod of the cutting and transporting tool, with the maximum value PM reached by this force at the time when cam 203 arrives at its top dead center position being equal to Tm·D/D'. Thus, the force, which is exerted by lever 220 on the support rod during the time when the chip is being pressed against the substrate by the head remains between a minimum value T2·D/D', and a maximum value Tm·D/D', this minimum value being such as to ensure that the chip is held satisfactorily against the substrate even when the head, as it rises again, ceases to press the chip against the substrate, and the maximum value being adjusted, by a presetting operation using screw 208, in such a way as to prevent damage to the chip or the substrate as a result of excessive pressure.

Cam 203 continues to be driven by shaft 204 past its top dead center position and now allows lever 206 to move in the opposite direction under the action of the spring which is tensioned between lever 206 and pin 212. Lever 201 remains stationary until such time as screw 208 comes to bear against abutment 210. From this moment, the assembly formed by levers 201 and 206 is drawn back towards its starting position under the action of a traction spring which is tensioned between the main lever 201 and a pin attached to support plate 20 and performs a function similar to spring 116. In the course of the movement of lever 201, roller 218 allows that end of lever 220 on which roller 219 is mounted to descend again. Lever 220 pivots about its shaft 221 under the prompting of a spring similar to spring 123, thus allowing the support rod of the cutting and transporting tool to rise again under the prompting of its compression spring. The rising movement of the support rod continues until such time as cam 203 has returned to its bottom dead center position. Referring to FIG. 1, it can be seen that, while cam 203 is returning from its top dead center position to its bottom dead center position, the cam 303 which is turned by shaft 204 at the same time as cam 203 eventually comes into contact again with the roller 315 of auxiliary lever 306, which enables cam 303 to thrust back roller 315 when, subsequently, the cam is again moved past its bottom dead center position by shaft 204.

FIG. 4 is a diagrammatic view of a simplified control arrangement, this view being intended to show the principal features of the invention. If the control arrangement shown in the present Figure is compared with the control arrangement described above which enables the soldering tool to be operated, it can be seen that parts of the arrangement in FIG. 4 which perform the same functions as similar parts of the control arrangement described above have been given the same reference.

In FIG. 4 there can thus be seen a main lever 101 which is pivoted on a shaft 102, a cam 103 which is attached to a shaft 104, an auxiliary lever 106 which, being pivoted about a shaft 107 arranged parallel to shaft 102, is in contact with cam 103, spring means 111 which are interposed between lever 101 and 106 and tend to move the main lever 101 in the direction of arrow F, and setting means (threaded rod 113 and sleeve 114) which enable the interacting force exerted by the spring means on the two arms to be adjusted. Under the action of means 111, the main lever 101 does in fact tend to move in the direction of F but is prevented from so doing by restraining means (abutment 110) which hold it in a predetermined position with respect to the auxiliary lever 106. The main lever 101, which was used to shift a lever 120 in the case of FIG. 1, in the present case shifts a movable article A situated in its path. The operation of the present control arrangement will not be described since it operates similarly to the arrangement described above.

FIG. 5 shows a modified embodiment of control arrangement constructed in accordance with the invention. This embodiment is distinguished from that shown in FIG. 4 by the fact that the spring means, which in FIG. 4 were formed by a traction spring 111, are formed in FIG. 5 by a compression spring 511 which is guided by a threaded rod 513 secured to the main lever 101, and is held compressed between the auxiliary lever 106 and nut 514 screwed onto rod 413, this rod passing freely through lever 106 as can be seen in FIG. 5. It may be pointed out that in both control arrangements which are shown in FIGS. 4 and 5, the auxiliary lever 106 is so positioned with respect to cam 103 that, when thrust back by cam 103 as the latter is turned past its bottom dead center, it moves in the same direction as that in which the movable article A moves when propelled by the control arrangement which is associated with it. It may also be pointed out that, in both the arrangements, the spring means (spring 111 or spring 511) which are interposed between levers 101 and 106 act on the main lever 101 in such a way that the latter is urged to move in the direction of arrow F, that is to say, in the direction in which lever 106 moves when shifted by cam 103.

FIG. 4 shows the displacement limiting means can act as limiting the minimum span between the levers 101 and 106 when the cam contacts the lever 106 on the side of this lever facing lever 101, whereas FIG. 5 shows the displacement limiting means act as limiting the maximum span between the levers when the cam contacts the lever 106 on the opposite side of the lever 101. In neither case does lever 101 contact the cam and the control movement of levers 101 is relayed through the mechanism.

Figure 6:
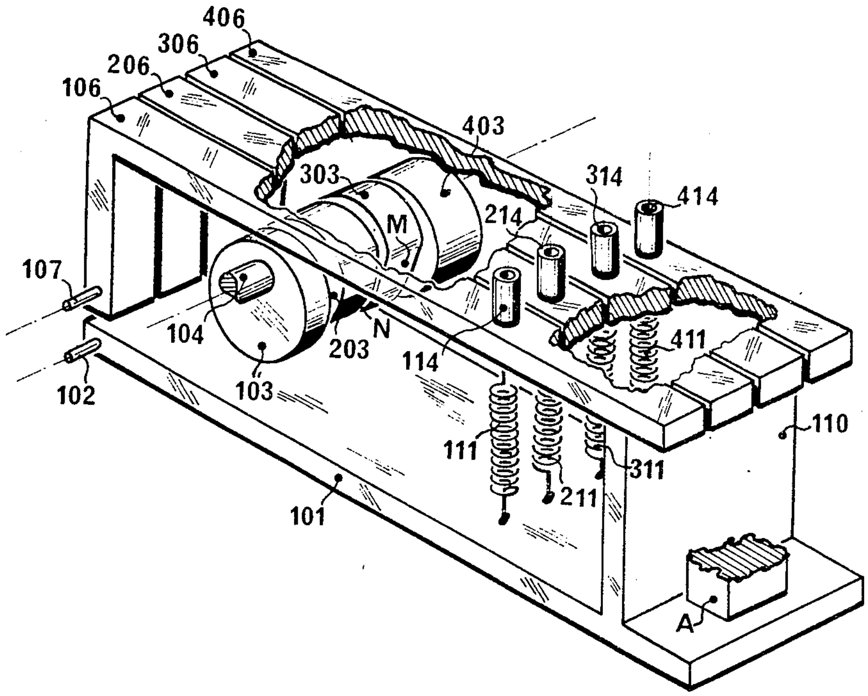
FIG. 6 is a perspective view showing another embodiment of the control arrangement of the invention.

FIG. 6 shows a modified embodiment of control arrangement which contains four auxiliary levers 106, 206, 306 and 406 which are pivoted on the same shaft 107, the auxiliary levers being operated by respective ones of four cams 103, 203, 303, and 403 which are secured to one and the same shaft 104. Four springs 111, 211, 311 and 411 are mounted between respective ones of these four levers and a main lever 101 which is pivoted about a shaft 102 parallel to shaft 107. These springs which, in the embodiment shown in FIG. 6, are traction springs, urge the main lever 101 to move in the same direction as that in which the auxiliary levers move when they are shifted by their respective cams. An abutment 110 attached to lever 101 enables the lever to be held under normal circumstances in a predetermined position with respect to the auxiliary levers, the latter normally being pressed against abutment 110. The interacting forces exerted by the springs may be adjusted to respective predetermined values T1, T2, T3 and T4 by setting means similar to those shown in FIG. 4, the adjustment being made by acting on one of the four sleeves 114, 214, 314 and 414 which are respectively associated with the springs 111, 211, 311 and 411. It should be mentioned that the cams 103, 203, 303 and 403, which are like eccentrics in general appearance, are exactly aligned with one another along the shaft 104 and that certain of the cams have flats, such as those marked M and N in FIG. 6. These flats enable the cams provided with them to suspend temporarily their pushing action against their respective auxiliary lever when shaft 104 is driven in rotation. Thus, if for example at a given moment cams 103 and 403 are the only ones exerting a thrusting action on levers 106 and 406, the main lever 101 is subjected to a resulting propulsive force whose strength, applied where the springs are attached to the main lever, is:

$TR = T1 + T4$

Similarly, if at some other time it is only cams 101, 201, 301 which exert a thrusting action on levers 106, 206 and 306, the strength of the resultant propulsive force becomes equal to: $TR = T1 + T2 + T3$.

It can thus be seen that, by using a suitable number of cams and auxiliary levers on the one hand and by selecting suitable positions for the facts on the cams on the other, it is possible, by adjusting the settings of the springs which are interposed between the main lever and the auxiliary lever, to produce a control arrangement which is capable of exerting, on a movable article A arranged in its path, forces whose magnitude is exactly known everywhere along the movement of the main lever and may differ from one point to the next in the course of this movement.

The invention is not of course limited to the methods of putting it into effect which have been described and illustrated and these are merely given by way of example. It does, in fact, embrace all means which represent technical equivalents of these described and illustrated, whether considered separately or in combination and when made use of in the context of the following claims.

I claim:

1. In a lever control arrangement for controlling the alternate reciprocating movement of a main lever pivotally mounted ona first shaft from a drive means including a motor having a rotatable shaft adapted to be rotatably driven upon energization of the motor, a cam attached to said rotatable shaft and a transmission mechanism disposed between said cam and said main lever and operably connecting said cam to the main lever for relaying the movement of the cam to the said main lever without any direct contact between the cam and the said main lever, comprising a first auxiliary lever, pivotally mounted to a second shaft arranged parallel to the first shaft of the main lever, said auxiliary lever being in contact with said cam, spring means connecting the two levers and urging the main lever in a first direction of said alternate movement, means limiting the displacement of said main lever to a defined value in the direction in which it is urged by the said spring means, and setting means associated with the said spring means for adjusting the interacting force exerted by the spring means on the two levers to a predetermined value, such that, if the main lever in the course of its movement in the first direction arising from the rotary movement of the cam, is arrested by an article arranged in its path, the force exerted by the main lever on the said article is at least equal to the said predetermined value multipled by the ratio between the distance which separates the first shaft of the main lever from the point where the said interacting force is exerted on said lever, and the distance which separates this same shaft from the point where the main lever is in contact with the said article.

2. A lever control arrangement according to claim 1, further including a return spring tensioned between the main lever and a fixed point to urge said main lever in a second direction opposite to said first direction, the force exerted by said return spring on the main lever being substantially negligible with respect to that which is exerted on said main lever by the spring means connecting the two levers.

3. A lever control arrangement according to claim 1 wherein said displacement means comprises an abutment secured to the main lever, said abutment being urged into contact with the auxiliary lever under the action of the said traction spring.

4. A lever control arrangement according to claim 1 wherein said cam is an eccentric.

5. In a lever control arrangement for controlling the movement, first in one direction and then in the other, of a main lever pivotally mounted on a first shaft, and a drive means including a drive motor having a rotatable shaft adapted to be rotatably driven upon energization of the motor, a first cam and N additional cams attached to the rotatable shaft N being at least equal to 1, and a transmission mechanism operably connecting said cam to the main lever comprising a first auxiliary lever pivotally mounted to a second shaft arranged parallel to the first shaft, said first cam being eccentric and said auxiliary lever being in contact with said first eccentric cam, traction spring means interposed between the two levers for urging the main lever in its first direction of movement, restraining means attached to the levers for preventing the main lever, when urged by the said spring means, from moving past a predetermined position with respect to the auxiliary lever, said restraining means including an abutment secured to said main lever, said abutment being urged into contact with said auxiliary lever under the action of said traction spring and setting means associated with the said spring means for adjusting the interacting force exerted by the spring means on the two levers to a predetermined value, such that, if the main lever in the course of its movement in the first direction arising from the rotary movement of the cam, is arrested by an article arranged in its path, the force exerted by the main lever on the said article is at least equal to the said predetermined value multiplied by the ratio between the distance which separates the shaft of the main lever from the point where the said interacting force is exerted on said lever, and the distance which separates this same shaft from the point where the main lever is in contact with the said article.

6. A lever control arrangement according to claim 11, including means for adjusting the urging force of the spring means associated with the first auxiliary lever and with the N additional auxiliary levers so as to exert interacting forces which are of different values from one auxilliary lever to another.

7. A lever control arrangement according to claim 6 including means for adjusting the urging force of the spring means associated with the first auxiliary lever and with the N additional auxiliary levers so as to exert interacting forces which are the same from one auxiliary lever to another.

8. A lever control arrangement according to claim 7 wherein the interacting force exerted by each spring means is of the order of 900 grams.

9. A lever control arrangement according to claim 11 wherein the additional spring means of the transmission mechanism comprises traction springs, and the restraining means comprises an abutment secured to the main lever, said abutment being urged into contact with the first and the N additional auxiliary levers under the action of the said traction springs.

10. A lever control arrangement according to claim 11 wherein at least one of said additional cams is an eccentric.

* * * * *

UNITED STATES PATENT AND TRADEMARK OFFICE
CERTIFICATE OF CORRECTION

PATENT NO. : 4,187,730

DATED : February 12, 1980

INVENTOR(S) : DELORME, M. Raymond

It is certified that error appears in the above-identified patent and that said Letters Patent are hereby corrected as shown below:

In item [73]

"Compagnie Internationale pour l'Informatique" should be -- Compagnie Internationale pour l'Informatique Cii-Honeywell Bull (Societe Anonyme) --.

Signed and Sealed this

*Seventh* Day of *April 1981*

[SEAL]

*Attest:*

RENE D. TEGTMEYER

*Attesting Officer* *Acting Commissioner of Patents and Trademarks*